July 24, 1923.
E. D. AINSWORTH
1,462,843
WHEEL PULLER AND EMERGENCY HUB
Filed Dec. 31, 1921
2 Sheets-Sheet 1
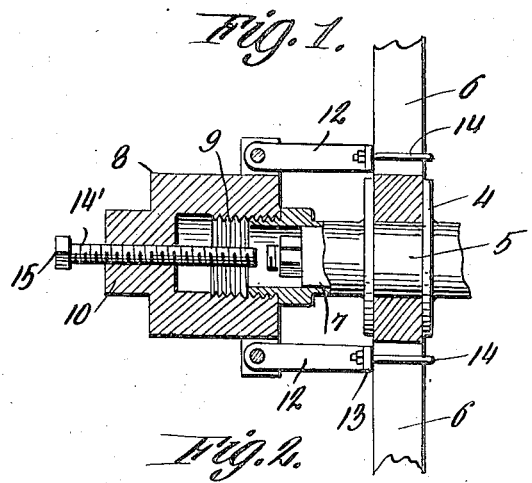
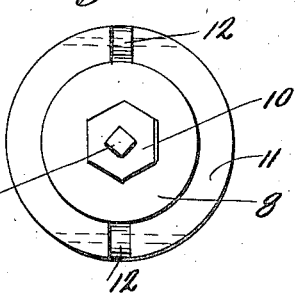
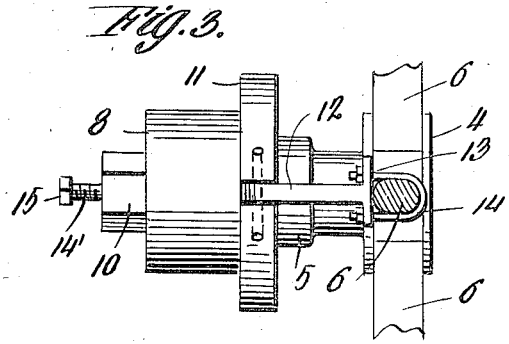
WITNESSES
Inventor
EARNEST D. AINSWORTH
By
Attorney July 24, 1923.
E. D. AINSWORTH
1,462,843
WHEEL PULLER AND EMERGENCY HUB
Filed Dec. 31. 1921
2 Sheets-Sheet 2
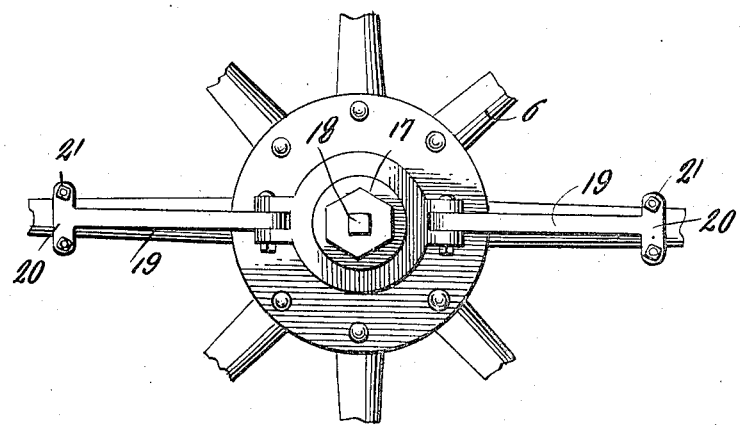
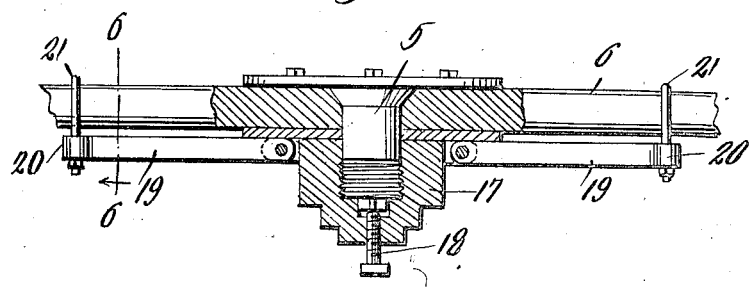
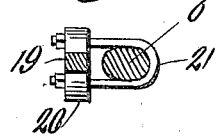
WITNESSES
Inventor
EARNEST D. AINSWORTH
By
Attorney Patented July 24, 1923.

1,462,843

UNITED STATES PATENT OFFICE.

EARNEST D. AINSWORTH, OF BONEITA SPRINGS, SOUTH DAKOTA.

WHEEL PULLER AND EMERGENCY HUB.

Application filed December 31, 1921. Serial No. 526,440.

*To all whom it may concern:*

Be it known that I, EARNEST D. AINSWORTH, a citizen of the United States, residing at Boneita Springs, in the county of Meade and State of South Dakota, have invented certain new and useful Improvements in Wheel Pullers and Emergency Hubs, of which the following is a specification.

The present invention relates to wheel pullers and emergency hub the primary object of which is to provide a device which may be conveniently attached to standard types of wheels to permit facile and expeditious removal of the latter from their axles or to take the place of the ordinary hub cap.

Another object of the invention is to provide a device of this character which is especially adapted for use in removing automobile wheels which, as is well known in the art, are infrequently removed consequently are often difficult to dislocate from their axles due to corrosion, the adherence of grease, dirt, etc.

A further object of the invention is to provide a device of this nature which is simple in construction and may be manufactured at a relatively low cost and conveniently carried in the tool box of the motor vehicle.

The above and other objects of this invention will be in part described and in part understood from the following description of the present preferred embodiment of the invention taken in connection with the accompanying drawings, wherein:

Figure 1 is a vertical sectional view of my invention used as a wheel puller constructed in accordance with this invention illustrating its application.

Figure 2 is an end elevation view of the same looking at the outer end of the puller.

Figure 3 is a side elevational view of the same illustrating the application thereof, Figure 4 is an elevation of my invention used as an emergency hub cap a portion of the wheel also being shown in elevation to indicate the manner in which the same is applied thereto, Figure 5 is a section of the same, and Figure 6 is a section taken on the line 6—6 of Figure 5 looking in the direction of the arrow.

In order to illustrate the application of this invention as a wheel puller referring to Figures 1, 2 and 3 a portion of a wheel generally designated 4 is provided which embodies a hub 5 and spokes 6. The hub may be of the usual or any desired configuration and is shown mounted on an axle 7 which likewise may be of the usual or any desired type. As is customary, the outer end of the hub is screw threaded adapted for the reception of a hub cap, and extends appreciably beyond the outer terminal of the axle.

The puller per se consists of a body generally designated 8 which in the present instance consists of a nut having internal screw threads 9 for engagement with the threads of the hub 5. The outer end of the nut is enlarged to provide a reduced end 10 preferably of polygonal configuration to permit engagement of the same by a wrench or the like so that the nut may be conveniently threaded on the hub.

An annulus 11 is formed on the outer periphery of the nut at the inner end of the latter and is provided with a diametrically opposite slots in which the outer ends of arms 12 are pivoted. The inner end of each arm is formed to provide a T head 13 which receives the free ends of an anchor bolt 14. The ends of the anchor bolt are detachably engaged with said head by means of nuts. As illustrated to advantage in the drawings the anchor bolts are preferably U shape so as to embrace certain of the spokes 6. In this way the nut is positively held from movement on the hub and accidental movement of said nut will be prevented.

Threaded through the reduced end 10 and closed end of the nut is a threaded bolt 14' the outer end of which is equipped with a rectangular head 15. This bolt serves as a feed screw and its inner end is adapted to impinge the outer end of the axle 7. Consequently as is apparent the bolt may be advanced through the nut through the medium of a wrench engaged with its head 15. After the bolt engages the axle continued inward movement of the bolt will exert an outward pressure upon the wheel 4 causing the latter to be removed from the axle 7. After this has been done the anchor bolts 14 and nut 8 may be removed in an apparent manner.

The device of this modification may likewise capacitate as a means for removing gears from shafts and also serve in analogous capacities. However in the present instance I have described the preferred use of the modification and the construction which is best adapted for the performance of the objects herein specified.

In the modification shown in Figures 4 to 6 inclusive it will be seen that the device is used as an emergency hub cap and includes the nut 17 which is internally threaded for engagement with the hub 5 and a bolt 18 is threaded through its closed end for engagement with the axle passing therethrough. The nut 17 which takes the place of the hub cap especially when the hub has become injured is provided with two pairs of spaced apertured ears at diametrically opposite points upon its annular periphery for pivotally receiving the arms 19 which are provided with the heads 20. These heads 20 are provided with spaced apertures for receiving the anchor bolts 21 which engage the spokes 6 of the wheel and thus the nut 17 is held securely in its proper relation with the wheel assembly and would permit the chauffeur to drive his automobile to a place where the same could be permanently repaired.

It is to be noted that the two modifications thus far described are substantially similar in structure and could be easily modified so that they might be interchangeable. In fact, numerous changes in form, proportion, and in the combination and arrangement of parts may be resorted to without departing from the spirit of my invention as hereinafter claimed

Having thus described my invention what I claim as new is:—

1. A device of the class described including a nut for engagement with the thread of a wheel hub and equipped with spoke embracing means, and a feed screw movable through the nut to impinge the wheel axle.

2. A device of the class described including a nut having an internally threaded bore for engagement with the threaded end of a hub, the outer end of the nut being closed and equipped with a reduced end of polygonal configuration, and a bolt threaded through said bushing to impinge the wheel axle.

3. A device of the class described including a nut, arms, one end of each of which is pivotally engaged with the nut and the opposite end equipped with anchor bolts for engagement with the spokes of a wheel, and a screw movable through said nut to engage the outer end of the wheel axle.

In testimony whereof I affix my signature in presence of two witnesses.

EARNEST D. AINSWORTH.

Witnesses:
 GUY R. HARWOOD,
 JOHN L. BAKER.